United States Patent [19]

Shibata et al.

[11] Patent Number: 5,757,514
[45] Date of Patent: May 26, 1998

[54] FACSIMILE REMOTE DIAGNOSTIC SYSTEM AND FACSIMILES

[75] Inventors: Kohichi Shibata; Masakazu Oyama; Kohichi Matsuo; Toshihiro Mori; Tetsuya Sugimoto, all of Osaka, Japan

[73] Assignee: Mita Industrial Co., Ltd., Osaka, Japan

[21] Appl. No.: 692,620

[22] Filed: Aug. 6, 1996

[30] Foreign Application Priority Data

Nov. 29, 1995 [JP] Japan .................................. 7-310250

[51] Int. Cl.[6] .................................................. H04N 1/00
[52] U.S. Cl. ........................... 358/434; 358/406; 358/439; 358/436
[58] Field of Search .............................. 358/405, 406, 358/407, 434, 435, 436, 438, 439, 443, 442

[56] References Cited

U.S. PATENT DOCUMENTS

| | | |
|---|---|---|
| 5,490,199 | 2/1996 | Fuller .................................... 379/1 |
| 5,583,615 | 12/1996 | Hashimoto et al. ................ 355/204 |
| 5,590,196 | 12/1996 | Moreau ............................... 380/18 |

Primary Examiner—Thomas D. Lee
Assistant Examiner—Jerome Grant, II
Attorney, Agent, or Firm—Beveridge, DeGrandi, Weilacher & Young, LLP

[57] ABSTRACT

In a facsimile remote diagnostic system according to the present invention, when a remote diagnosis rejection mode is selected, data having no remote diagnostic function is set as data relating to a remote diagnostic function in a pre-procedure signal sent out from the facsimile, whereby remote diagnosis is stopped in the pre-procedure stage. Consequently, a user of the facsimile can reject the remote diagnosis with his or her intention.

5 Claims, 9 Drawing Sheets

FACSIMILE REMOTE DIAGNOSTIC SYSTEM AND FACSIMILES

BACKGROUND OF THE INVENTION

1. Field of the Invention

The present invention relates to a facsimile remote diagnostic system and facsimiles.

2. Description of the Prior Art

In some systems in which a center station manages a plurality of facsimiles, the center station can carry out remote diagnosis on a facsimile on the user side. Specifically, the center station first calls the facsimile on the user side, and receives set data stored in an SRAM (Static RAM) in the facsimile on the user side. Such a communication mode shall be referred to as a remote diagnosis receiving mode. When communication in the remote diagnosis receiving mode is terminated, a line is disconnected.

The center station changes the received set data and adds new data thereto, to generate new set data. The center station calls the facsimile on the user side again, and transmits the generated new set data to the facsimile on the user side, to update the contents of the SRAM in the facsimile on the user side. Such a communication mode shall be referred to as a remote diagnosis transmission mode.

In such remote diagnosis, all set data stored in the SRAM in the facsimile are sent to the center station. Therefore, information relating to privacy such as the called parties set in abbreviated dials or one-touch dials and communication hierarchy information are also transmitted to the center station without a user's permission.

Communication is achieved in the facsimile on the user side, and the set data in the abbreviated dials or the one-touch dials are changed and new data is added thereto, for example, during a period elapsed from the time when the set data in the facsimile on the user side is sent to the center station in the remote diagnosis receiving mode until the new set data is sent to the facsimile on the user side from the center station in the remote diagnosis transmission mode.

In such a case, when the new set data is thereafter sent to the facsimile on the user side from the center station in the remote diagnosis transmission mode, and the sent set data is written into the SRAM, the results of communication achieved between the communication in the remote diagnosis receiving mode and the communication in the remote diagnosis transmission mode, and the contents of the changed set data, the new data added to the set data, and the like are lost.

SUMMARY OF THE INVENTION

An object of the present invention is to provide facsimiles capable of rejecting remote diagnosis and a facsimile remote diagnostic system.

Another object of the present invention is to provide a facsimile capable of inhibiting communication from being achieved and inhibiting set data in abbreviated dials or one-touch dials from being changed and new data from being added thereto, for example, during a period elapsed from the time when set data is transmitted by remote access from the center station until new set data is received from a center station.

In a facsimile remote diagnostic system according to the present invention which comprises one or a plurality of facsimiles and a center station for managing the facsimile or facsimiles, the center station having a function of carrying out remote diagnosis on the facsimile or facsimiles, the facsimile comprises remote diagnosis permission or rejection mode selecting means for selecting a remote diagnosis permission mode in which remote diagnosis is permitted and a remote diagnosis rejection mode in which remote diagnosis is rejected, means for setting data having a remote diagnostic function as data relating to a remote diagnostic function in a pre-procedure signal sent out from the facsimile when the remote diagnosis permission mode is selected, and means for setting data having no remote diagnostic function as data relating to a remote diagnostic function in a pre-procedure signal sent out from the facsimile when the remote diagnosis rejection mode is selected.

In the facsimile remote diagnostic system according to the present invention, when the remote diagnosis rejection mode is selected, the data having no remote diagnostic function is set as the data relating to a remote diagnostic function in the pre-procedure signal sent out from the facsimile, whereby the remote diagnosis is stopped in the pre-procedure stage. Consequently, a user of the facsimile can reject the remote diagnosis with his or her intention. It is preferable that the center station is provided with means for sending out data for changing the remote diagnosis permission or rejection mode of the facsimile to the remote diagnosis rejection mode when set data for the facsimile is transmitted to the facsimile from the center station, and the facsimile is provided with means for changing the remote diagnosis permission or rejection mode of the facsimile to the remote diagnosis rejection mode when the data for changing the remote diagnosis permission or rejection mode of the facsimile to the remote diagnosis rejection mode is received.

It is preferable that the facsimile is provided with means for changing the remote diagnosis permission or rejection mode to the remote diagnosis rejection mode when a predetermined time has elapsed since the remote diagnosis permission mode was selected.

In a facsimile having such a function that remote diagnosis is carried out by a center station, a first facsimile according to the present invention is characterized by comprising remote diagnosis permission or rejection mode selecting means for selecting a remote diagnosis permission mode in which remote diagnosis is permitted and a remote diagnosis rejection mode in which remote diagnosis is rejected, means for setting data having a remote diagnostic function as data relating to a remote diagnostic function in a pre-procedure signal sent out from the facsimile when the remote diagnosis permission mode is selected, and means for setting data having no remote diagnostic function as data relating to a remote diagnostic function in a pre-procedure signal sent out from the facsimile when the remote diagnosis rejection mode is selected.

It is preferable that the facsimile comprises means for changing the remote diagnosis permission or rejection mode to the remote diagnosis rejection mode when a predetermined time has elapsed since the remote diagnosis permission mode was selected.

In the first facsimile according to the present invention, when the remote diagnosis rejection mode is selected, the data having no remote diagnostic function is set as the data relating to a remote diagnostic function in the pre-procedure signal sent out from the facsimile, whereby the remote diagnosis is stopped in the pre-procedure stage. Consequently, a user of the facsimile can reject the remote diagnosis with his or her intention.

In a facsimile having such a function that remote diagnosis is carried out by a center station, a second facsimile according to the present invention is characterized by comprising means for bringing the acceptance of input from an operation section into an inhibited state immediately after set data is transmitted to a center station by remote access from the center station, and means for releasing the inhibited state of the acceptance of the input from the operation section when new set data from the center station is received.

In the second facsimile according to the present invention, communication is inhibited from being achieved, and set data in abbreviated dials or one-touch dials are inhibited from being changed and new data is inhibited from being added, for example, during a period elapsed from the time when the set data is transmitted to the center station by remote access from the center station until the new set data from the center station is received.

In a facsimile having such a function that remote diagnosis is carried out by a center station, a third facsimile according to the present invention is characterized by comprising means for bringing the acceptance of input from an operation section into an inhibited state and starting the measurement of a predetermined time immediately after set data is transmitted to the center station by remote access from the center station, means for releasing the inhibited state of the acceptance of the input from the operation section when the predetermined time has elapsed before new set data from the center station is received, and means for releasing the inhibited state of the acceptance of the input from the operation section when the new set data from the center station is received before the predetermined time has elapsed.

In the third facsimile according to the present invention, when no data is transmitted from the center station even if the predetermined time has elapsed since the acceptance of the input from the operation section was brought into the inhibited state, the inhibited state of the acceptance of the input from the operation section is released.

In a facsimile having such a function that remote diagnosis is carried out by a center station, a fourth facsimile according to the present invention is characterized by comprising means for bringing the acceptance of input from an operation section into an inhibited state and starting the measurement of a predetermined time immediately after set data is transmitted to the center station by remote access from the center station, means for demanding the transmission of the set data of the center station when the predetermined time has elapsed before new set data from the center station is received, and means for releasing the inhibited state of the acceptance of the input from the operation section when the new set data from the center station is received.

In the fourth facsimile according to the present invention, when no data is transmitted from the center station even if the predetermined time has elapsed since the acceptance of the input from the operation section was brought into the inhibited state, the transmission of the set data is demanded of the center station.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS (1) Description of a First Embodiment of the Present Invention Description of a first embodiment of the present invention on the basis of FIGS. 1 to 5.

Figure 1:
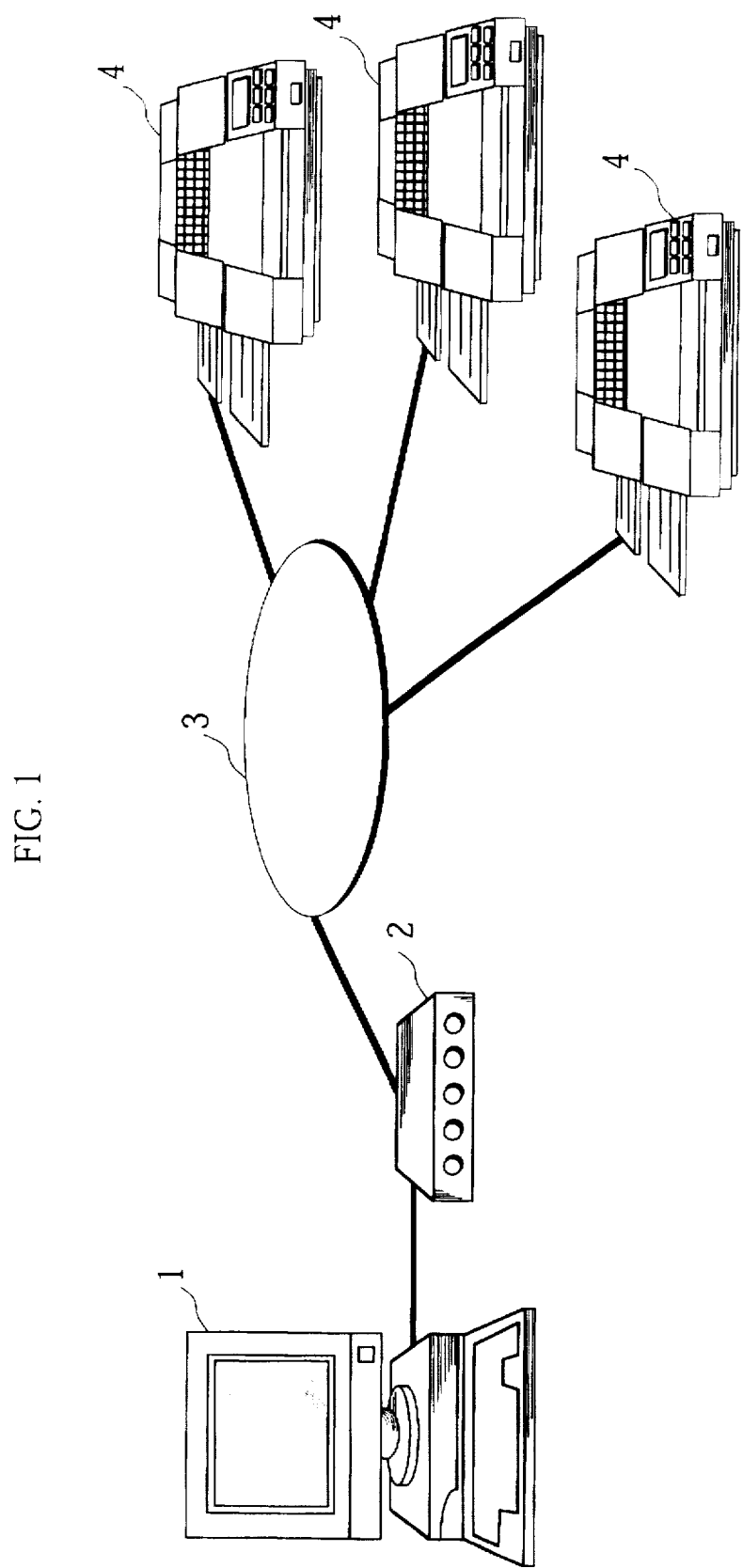
FIG. 1 is a block diagram showing the entire system configuration.

FIG. 1 illustrates the entire system configuration.

A center station 1 manages a plurality of facsimiles (terminal stations) 4. Each of the terminal stations 4 is connected to the center station 1 through a telephone line 3 and a facsimile modem 2 provided on the side of the center station 1. As the center station 1, a personal computer on which facsimile communication software is carried is used.

Figure 2:
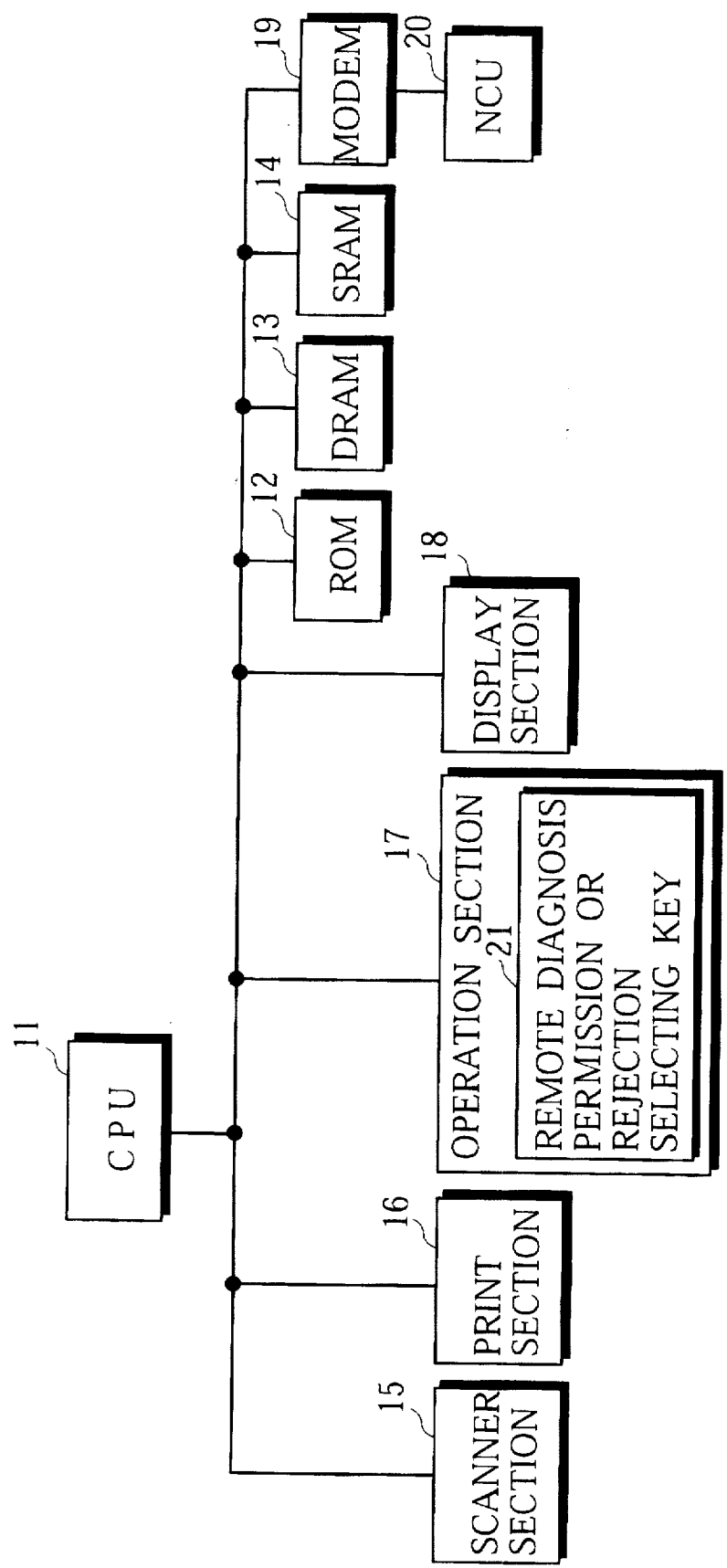
FIG. 2 is a block diagram showing the electrical construction of a facsimile in a first embodiment.

FIG. 2 illustrates the construction of the terminal station 4.

The terminal station 4 is controlled by a CPU 11. The CPU 11 comprises a ROM 12 storing its program and the like, a DRAM (Dynamic RAM) 13 storing necessary data such as image data, and an SRAM 14 for storing various set contents. The SRAM 14 is backed up by batteries or the like.

A scanner section 15 for reading an original image, a print section 16 for printing a received image, an operation section 17 for performing various types of operations and setting, a display section 18 for displaying various guides, a modem 19, and the like are connected to the CPU 11. An NCU (Network Control Unit) 20 is connected to the modem 19. A public telephone line 3 (see FIG. 1) is connected to the NCU 20.

The set contents of a facsimile communication procedure signal such as an NSF (Non-Standard Facilities) signal are also stored in the SRAM 14. When the terminal station 4 is called from the center station 1, the NSF signal sent out to the center station 1 from the terminal station 4 is provided with a bit indicating whether or not a remote diagnostic function is provided. In a terminal station having a remote diagnostic function, a bit indicating whether or not a remote diagnostic function is provided has been conventionally always set to "1", i.e., a value indicating that a remote diagnostic function is provided.

In the terminal station 4 in the present embodiment, the operation section 17 is provided with a remote diagnosis permission or rejection selecting key 21 for selecting a remote diagnosis permission mode or a remote diagnosis rejection mode. Further, a remote diagnostic function presence or absence flag F indicating contents to be set in the bit indicating whether or not a remote diagnostic function is provided in the NSF signal is stored in the SRAM 14.

When the remote diagnosis permission mode is selected by the remote diagnosis permission or rejection selecting key 21, the remote diagnostic function presence or absence flag F in the SRAM 14 is set (F=1). When the remote diagnostic function presence or absence flag F is set (F=1), the bit indicating whether or not a remote diagnostic function is provided in the NSF signal is set to "1" at the time of communication.

When the remote diagnosis rejection mode is selected by the remote diagnosis permission or rejection selecting key 21, the remote diagnostic function presence or absence flag F in the SRAM 14 is reset (F=0). When the remote diagnostic function presence or absence flag F is reset (F=0), the bit indicating whether or not a remote diagnostic function is provided in the NSF signal is set to "0" at the time of communication.

Figure 3:
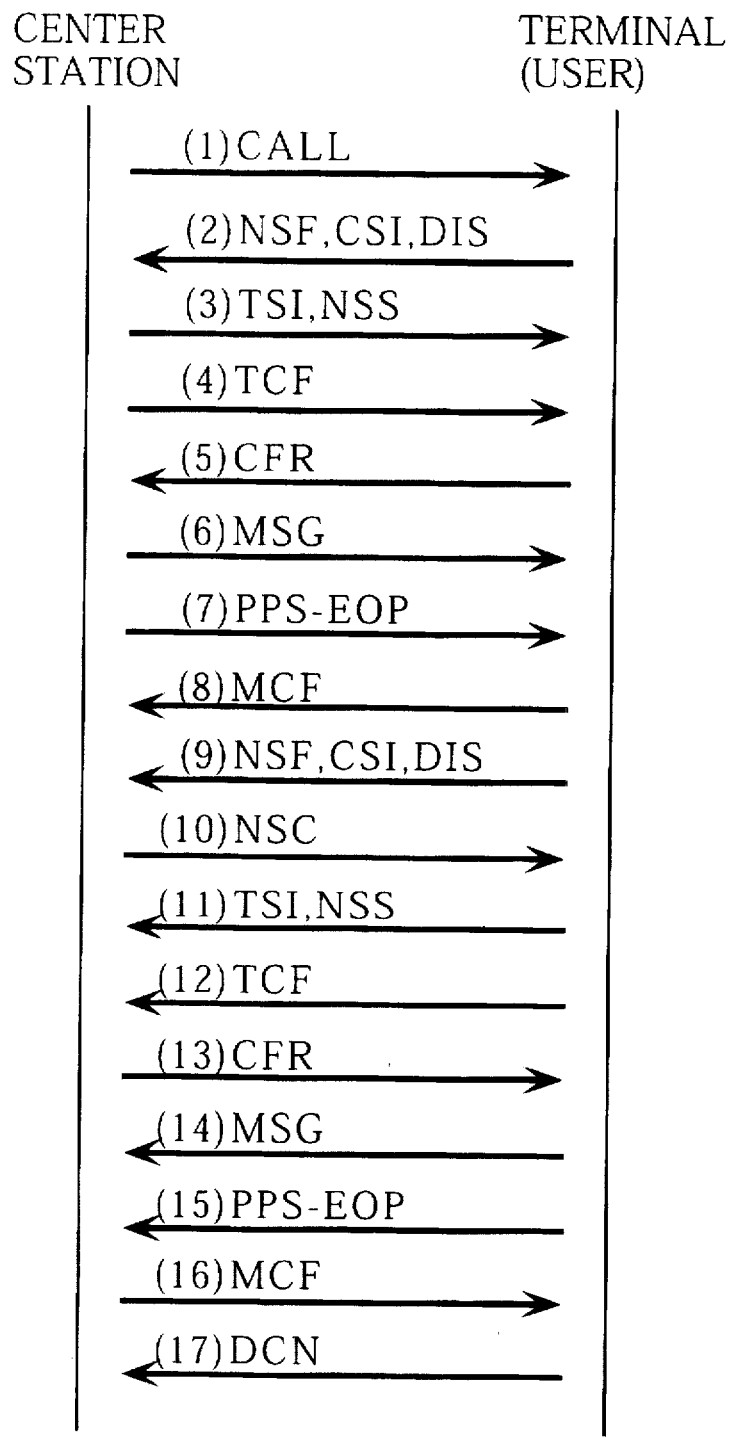
FIG. 3 is a sequence chart showing a sequence of a communication mode in which a center station 1 receives set data in a terminal station 4 (a remote diagnosis receiving mode) in a case where a remote diagnosis permission mode is selected.

FIG. 3 illustrates a sequence of a communication mode in which the center station 1 receives set data in the terminal station 4 (a remote diagnosis receiving mode) in a case where the remote diagnosis permission mode is selected. In FIG. 3, a numeral put in parentheses denotes a sequence number.

The terminal station 4 which will carry out remote diagnosis is first called from the center station 1, whereby the line is connected (a sequence number (1)).

When the line is connected, the terminal station 4 sends out an NSF signal, a CSI (Called Subscriber Identification) signal and a DIS (Digital Identification Signal) signal (a sequence number (2)).

The center station 1 judges whether or not the terminal station 4 has a remote diagnostic function on the basis of the received NSF signal. In this case, the remote diagnosis permission mode is selected, and "1" is set in the bit indicating whether or not a remote diagnostic function is provided in the NSF signal, whereby the center station 1 judges that the terminal station 4 has a remote diagnostic function. Consequently, the center station 1 sends out a TSI (Transmitting Subscriber Identification) signal and an NSS (Non-Standard Facilities Set-up) signal (a sequence number (3)), and sends out a TCF (Training Check) signal (a sequence number (4)). The NSS signal represents information indicating that communication is for remote diagnosis.

The terminal station 4 checks the NSS signal sent from the center station 1, and confirms that communication is for remote diagnosis. The terminal station 4 further checks the quality of an image by the TCF signal sent from the center station 1. Thereafter, the terminal station 4 sends out a CFR (Confirmation to Receive) signal (a sequence number (5)).

The center station 1 sends out data (MSG) for designating the range in which data is transferred from the SRAM 14 (a sequence number (6)) upon receiving the CFR signal, and sends out a PPS-EOP (End of Procedure) signal upon terminating the sending (a sequence number (7)).

The terminal station 4 sends out a MCF (Message Confirmation) signal (a sequence number (8)) and sends out a NSF signal, a CSI signal and a DIS signal again (a sequence number (9)) upon receiving the PPS-EOP signal.

The center station 1 sends out a NSC (Non-Standard Facilities Command) signal (a sequence number (10)) upon receiving the NSF signal, the CSI signal and the DIS signal.

The terminal station 4 sends out a TSI signal and a NSS signal (a sequence number (11)) and sends out a TCF signal (a sequence number (12)) upon receiving the NSC signal.

The center station 1 sends out a CFR signal (a sequence number (13)) upon receiving the TCF signal.

The terminal station 4 sends out the range designated from the center station 1 in the SRAM 14 (a sequence number (14)) upon receiving the CFR signal. The terminal station 4 sends out a PPS-EOP signal (a sequence number (15)) upon terminating the sending of all the data.

The center station 1 sends out an MCF signal (a sequence number (16)) upon receiving the PPS-EOP signal. The terminal station 4 sends out a DCN (Disconnect) signal (a sequence number (17)) upon receiving the MCF signal. Consequently, the line is disconnected.

When the center station 1 thus acquires the data in the SRAM 14 in the terminal station 4, the center station 1 changes the acquired set data and adds new data thereto, to generate new set data. The center station 1 transmits the generated new set data to the terminal station 4, to update the contents of the SRAM 14 in the terminal station 4.

Figure 4:
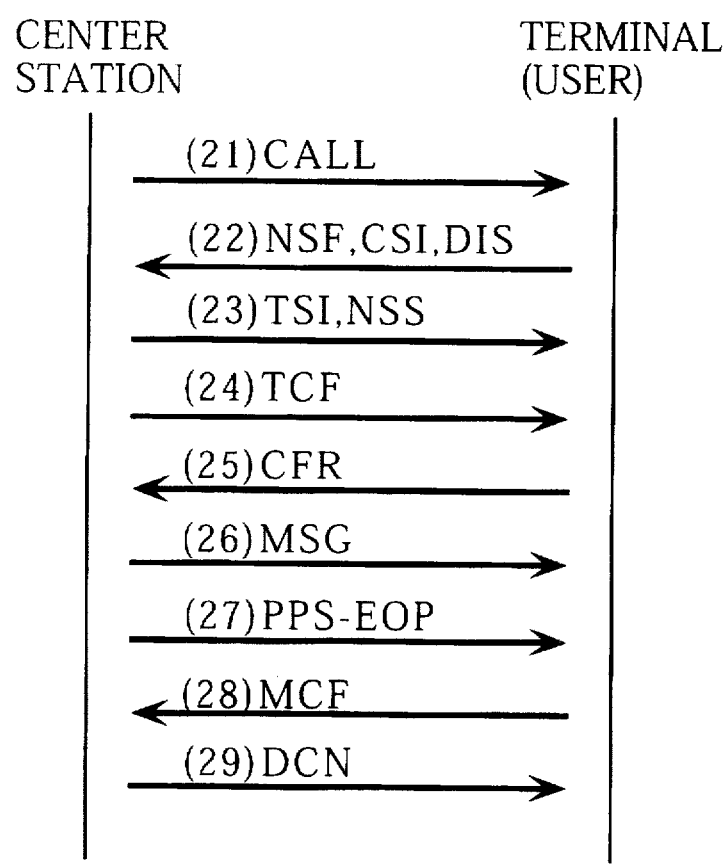
FIG. 4 is a sequence chart showing a sequence of a communication mode in which a center station 1 transmits newly generated set data to a terminal station 4 (a remote diagnosis transmission mode)

FIG. 4 illustrates a sequence of a communication mode in which the center station 1 transmits newly generated set data to the terminal station 4 (a remote diagnosis transmission mode). In FIG. 4, a numeral put between parentheses denotes a sequence number.

The terminal station 4 is first called from the center station 1, whereby the line is connected (a sequence number (21)).

When the line is connected, the terminal station 4 sends out a NSF signal, a CSI signal and a DIS signal (a sequence number (22)).

The center station 1 sends out a TSI signal and a NSS signal (a sequence number (23)), and sends out a TCF signal (a sequence number (24)).

The terminal station 4 sends out a CFR signal (a sequence number (25)).

The center station 1 sends out newly generated set data (MSG) (a sequence number (26)) upon receiving the CFR signal, and sends out a PPS-EOP signal (a sequence number (27)) upon terminating the sending.

The terminal station 4 writes, when it receives the newly generated set data, the received set data into the SRAM 14. Consequently, the set data in the SRAM 14 is updated. The terminal station 4 sends out a MCF signal (a sequence number (28)) upon receiving the PPS-EOP signal.

The center station 1 sends out a DCN signal (a sequence number (29)) upon receiving the MCF signal. Consequently, the line is disconnected.

Figure 5:
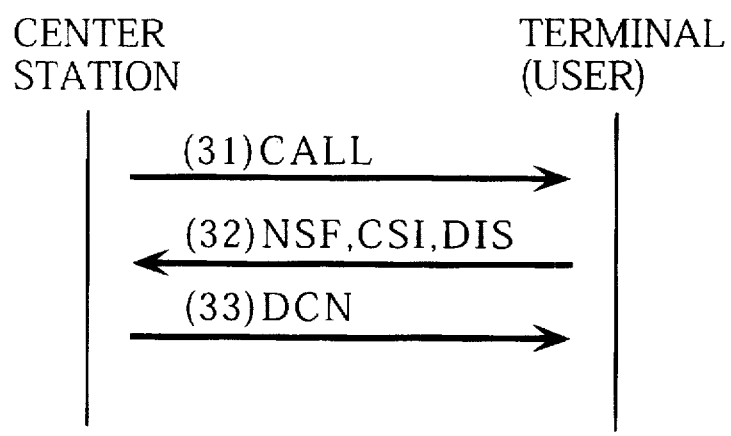
FIG. 5 is a sequence chart showing a sequence of a communication mode in which a center station 1 receives set data in a terminal station 4 (a remote diagnosis receiving mode) in a case where a remote diagnosis rejection mode is selected.

FIG. 5 illustrates a sequence of a communication mode in which the center station 1 receives set data in the terminal station 4 (a remote diagnosis receiving mode) in a case where the remote diagnosis rejection mode is selected. In FIG. 5, a numeral put in parentheses denotes a sequence number.

The terminal station 4 which will carry out remote diagnosis is first called from the center station 1, whereby the line is connected (a sequence number (31)).

When the line is connected, the terminal station 4 sends out a NSF signal, a CSI signal and a DIS signal (a sequence number (32)).

The center station 1 judges whether or not the terminal station 4 has a remote diagnostic function on the basis of the received NSF signal. In this case, the remote diagnosis rejection mode is selected, and "0" is set in the bit indicating whether or not a remote diagnostic function is provided in the NSF signal, whereby the center station 1 judges that the terminal station 4 does not have a remote diagnostic function.

Consequently, the center station 1 sends out a DCN signal (a sequence number (33)). Consequently, the line is disconnected.

The user can reject remote diagnosis from the center station 1 by thus selecting the remote diagnosis rejection mode using the remote diagnosis permission or rejection selecting key 21, whereby privacy can be protected with a user's intention.

It is preferable that the user of the terminal station 4 usually selects the remote diagnosis rejection mode, notifies, when the center station 1 carries out remote diagnosis on the terminal 4, the user of the terminal station 4 that remote diagnosis will be carried out by a telephone or the like, so that the remote diagnosis is carried out when the user selects the remote diagnosis permission mode using the remote diagnosis permission or rejection selecting key 21. In such a case, even if the remote diagnosis is terminated, the user sometimes forgets to return the remote diagnosis permission or rejection mode from the remote diagnosis permission mode to the remote diagnosis rejection mode.

In order to avoid such situations, it is preferable to transmit, when the center station 1 transmits newly generated set data to the terminal station 4, data for resetting the remote diagnostic function presence or absence flag F in the SRAM 14 in the terminal station 4.

Alternatively, a timer may be started when the user selects the remote diagnosis permission mode using the remote diagnosis permission or rejection selecting key 21 so that the remote diagnosis rejection mode is automatically selected when a predetermined time has elapsed.

Referring now to FIGS. 6 to 9, second, third and fourth embodiments of the present invention will be described.

In the second, third and fourth embodiments of the present invention, the system configuration is the same as that shown in FIG. 1.

Figure 6:
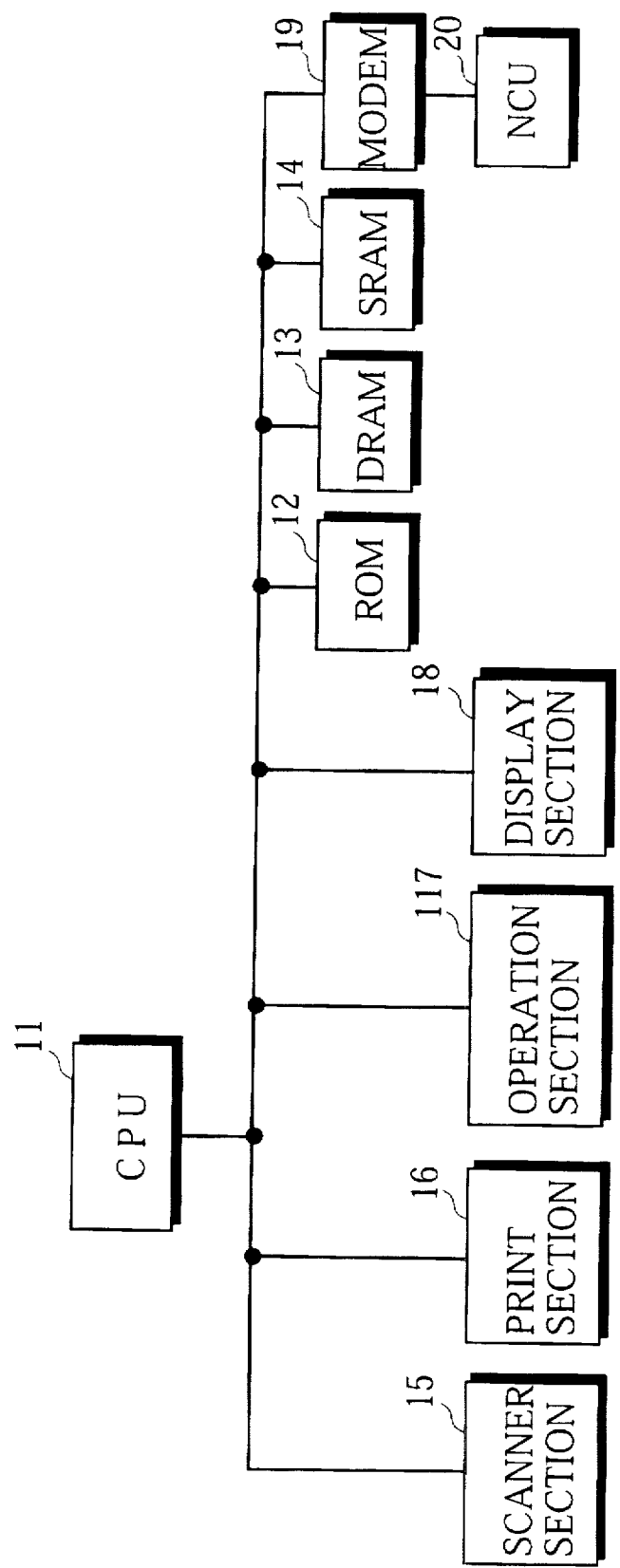
FIG. 6 is a block diagram showing the electrical construction of facsimiles according to second to fourth embodiments.

FIG. 6 illustrates the construction of a terminal station 4. In FIG. 6, the same sections as those shown in FIG. 2 are assigned the same reference numerals and hence, the description thereof is not repeated. The construction of the terminal station 4 is approximately the same as the construction of the terminal station 4 shown in FIG. 2. An operation section 117 is not provided with a remote diagnosis permission or rejection selecting key 21 for selecting a remote diagnosis permission mode or a remote diagnosis rejection mode as shown in FIG. 2. Further, a bit indicating whether or not a remote diagnostic function is provided which is stored in an SRAM 14 shall be always set to "1", i.e., a value indicating that a remote diagnostic function is provided.

[2] Description of a Second Embodiment of the Present Invention

Figure 7:
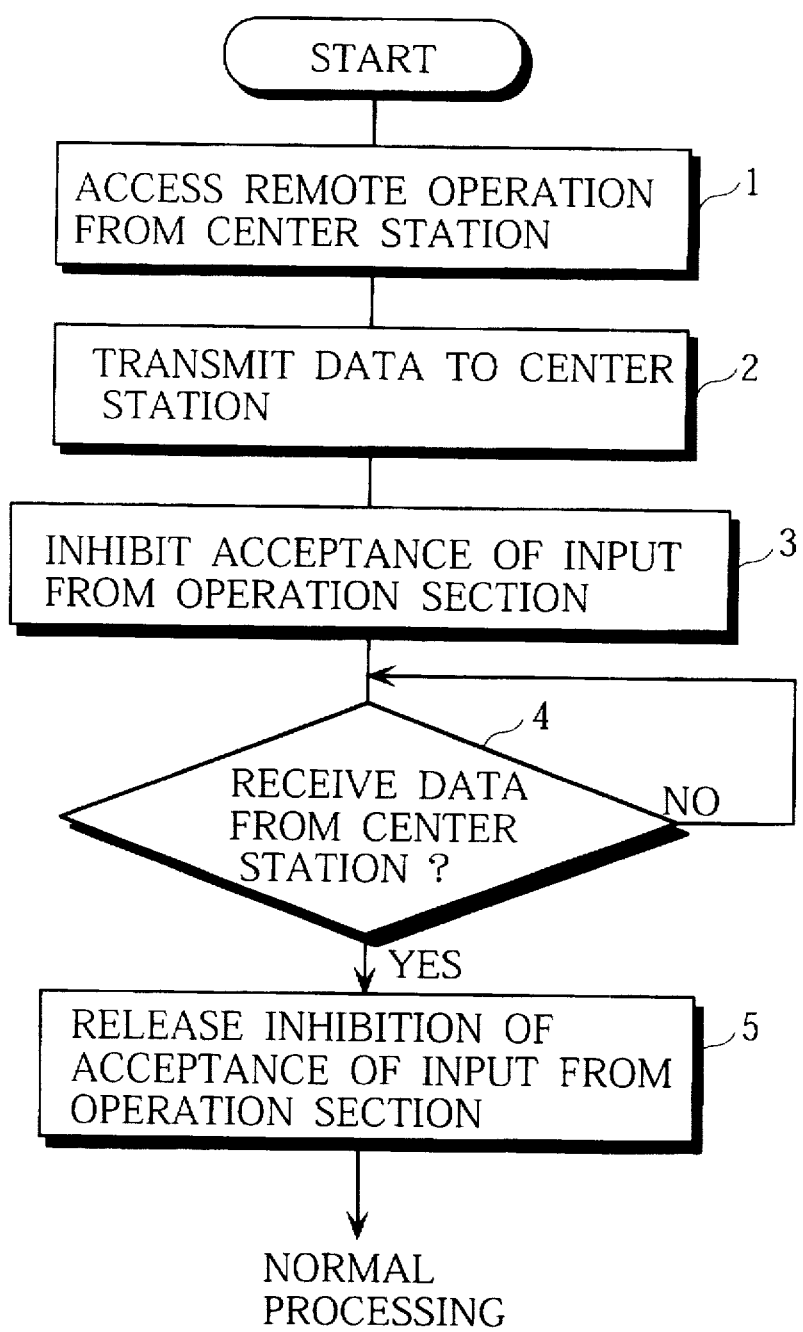
FIG. 7 is a flow chart showing operations of a terminal station 4 at the time of remote diagnosis.

Description is made of a second embodiment of the present invention on the basis of FIG. 7.

FIG. 7 shows operations of a terminal station 4 at the time of remote diagnosis.

When a remote operation is accessed from a center station 1 (step 1), set data in an SRAM 14 is transmitted to the center station 1 (step 2).

When the set data is transmitted, the acceptance of input from an operation section 117 is brought into an inhibited state (step 3). Specifically, even if the operation section 117 is thereafter operated, the input from the operation section 117 is rendered ineffective.

When new set data from the center station 1 is received again by access from the center station 1 after a line is disconnected once (step 4), the inhibited state of the acceptance of the input from the operation section 117 is released (step 5). Specifically, when the operation section 117 is thereafter operated, the input from the operation section 117 is treated as effective one.

In the above-mentioned second embodiment, the acceptance of the input from the operation section 117 is brought into the inhibited state in a period elapsed until communication in a remote diagnosis transmission mode is started after communication in a remote diagnosis receiving mode. Therefore, communication is not achieved, and set data is not changed and new data is not added thereto, for example, on the side of a terminal station during this period.

[3] Description of a Third Embodiment of the Present Invention

Figure 8:
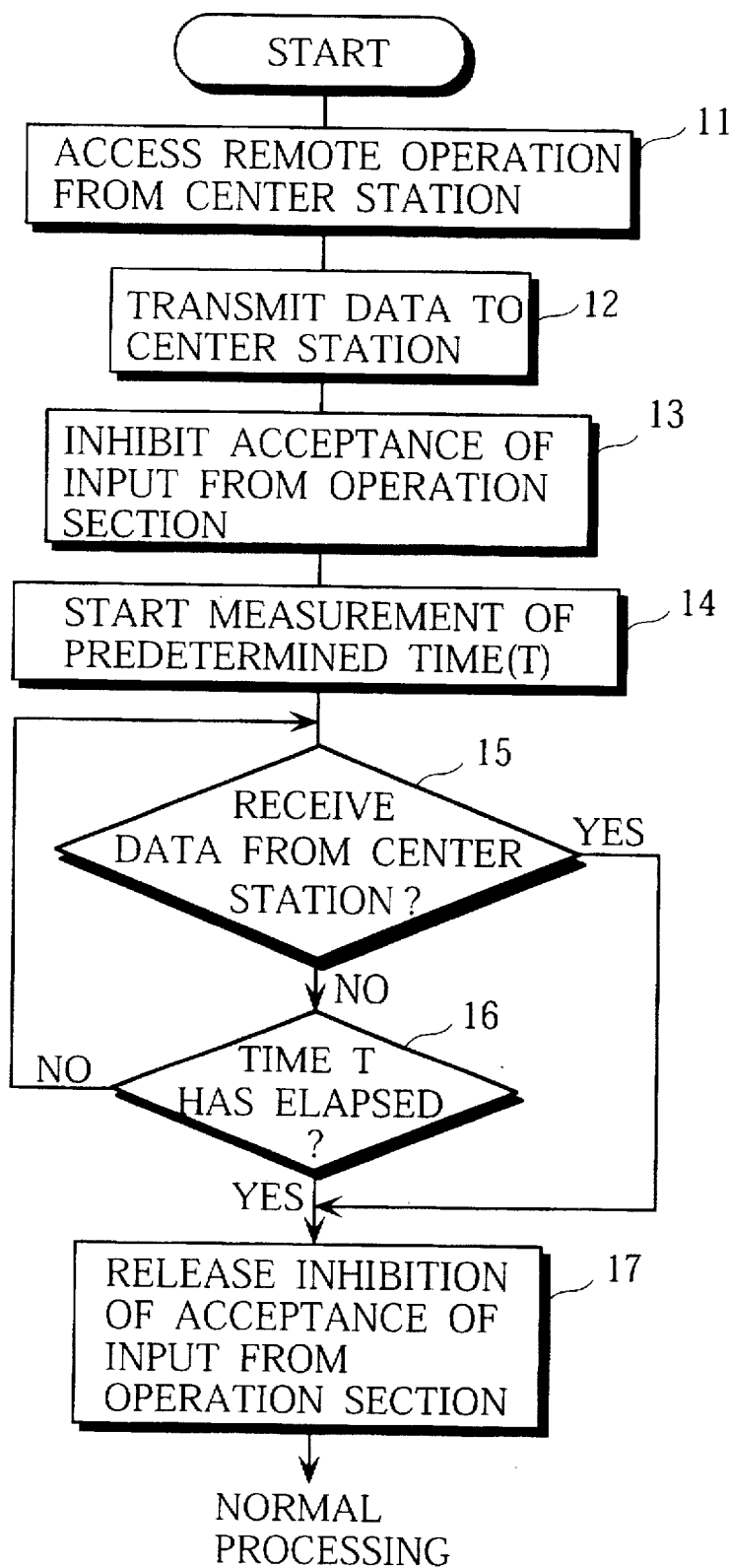
FIG. 8 is a flow chart showing another example of operations of a terminal station 4 at the time of remote diagnosis.

Description is made of a third embodiment of the present invention on the basis of FIG. 8.

There are some cases where no data is transmitted from a center station 1 due to some cause after communication in a remote diagnosis receiving mode. In such cases, there occur situations where the inhibited state of the acceptance of the input from the operation section 117 is continued over a long time in the above-mentioned second embodiment.

In the third embodiment, in order to avoid the occurrence of situations where the inhibited state of the acceptance of input from an operation section 117 is continued over a long time in a case where no data is transmitted from the center station 1 due to some cause after communication in a remote diagnosis receiving mode, when no data is transmitted from the center station 1 even if a predetermined time has elapsed since the acceptance of the input from the operation section 117 was brought into the inhibited state, the inhibited state of the acceptance of the input from the operation section 117 is released.

FIG. 8 shows operations of a terminal station 4 at the time of remote diagnosis.

When a remote operation is accessed from the center station 1 (step 11), set data in a SRAM 14 is transmitted to the center station 1 (step 12).

When the set data is transmitted, the acceptance of the input from the operation section 117 is brought into the inhibited state (step 13). Specifically, even if the operation section 117 is thereafter operated, the input from the operation section 117 is rendered ineffective.

When the acceptance of the input from the operation section 117 is brought into the inhibited state, the measurement of a predetermined time T is started (step 14).

When new set data from the center station 1 is received before the predetermined time T has elapsed (YES in step 15), the inhibited state of the acceptance of the input from the operation section 117 is released, as in the second embodiment (step 17).

When the predetermined time T has elapsed before the new set data from the center station 1 is received (NO in step 15, and YES in step 16), the inhibited state of the acceptance of the input from the operation section 117 is released (step 17). Specifically, when the operation section 117 is thereafter operated, the input from the operation section 117 is treated as effective one.

[4] Description of a Fourth Embodiment of the Present Invention

Figure 9:
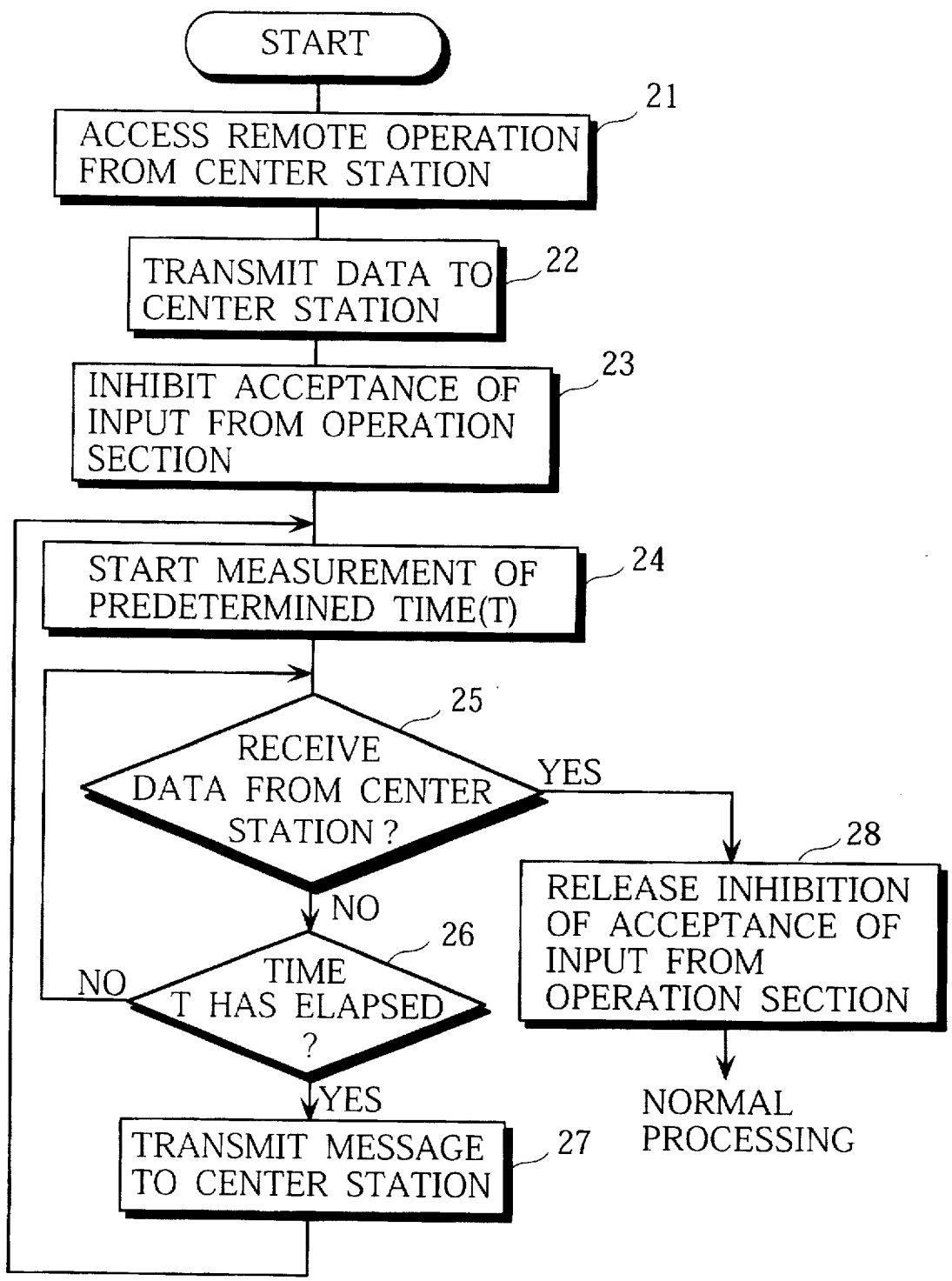
FIG. 9 is a flow chart showing still another example of operations of a terminal station 4 at the time of remote diagnosis.

Description is made of a fourth embodiment of the present invention on the basis of FIG. 9.

In the fourth embodiment, when data from a center station 1 is not transmitted even if a predetermined time has elapsed since the acceptance of the input from an operation section 117 was brought into an inhibited state, a message for demanding data transmission is sent out to the center station 1.

FIG. 9 shows operations of a terminal station 4 at the time of remote diagnosis.

When a remote operation is accessed from the center station 1 (step 21), set data in an SRAM 14 is transmitted to the center station 1 (step 22).

When the set data is transmitted, the acceptance of the input from the operation section 117 is brought into the inhibited state (step 23). Specifically, even if the operation section 117 is thereafter operated, the input from the operation section 117 is rendered ineffective.

When the acceptance of the input from the operation section 117 is brought into the inhibited state, the measurement of a predetermined time T is started (step 24).

When new set data from the center station 1 is received (YES in step 25), the inhibited state of the acceptance of the input from the operation section 117 is released, as in the second embodiment (step 28).

When the predetermined time T has elapsed before the new set data from the center station 1 is received (NO in step 25, and YES in step 26), a message for demanding data transmission is sent out to the center station 1 (step 27). The program is then returned to the step 24. In the step 24, the measurement of the predetermined time T is started, after which the processing in the step 25 and the subsequent steps is performed again. When the center station 1 transmits the set data on the basis of the message for demanding data transmission, and the terminal station 4 receives this data (YES in step 25), the inhibited state of the acceptance of the input from the operation section 117 is released (step 28).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A facsimile remote diagnostic system comprising one or a plurality of facsimiles and a center station for managing the facsimile or facsimiles, the center station having a function of carrying out remote diagnosis on the facsimile or facsimiles, wherein at least one facsimile comprises remote diagnosis permission or rejection mode selecting means for selecting a remote diagnosis permission mode in which remote diagnosis is permitted and a remote diagnosis rejection mode in which remote diagnosis is rejected, means for setting data having a remote diagnostic function as data relating to a remote diagnostic function in a pre-procedure signal sent out from the facsimile when the remote diagnosis permission mode is selected, and means for setting data having no remote diagnostic function as data relating to a remote diagnostic function in a pre-procedure signal sent out from the facsimile when the remote diagnosis rejection mode is selected, wherein the center station comprises means for sending out data for changing the remote diagnosis permission or rejection mode of the facsimile to the remote diagnosis rejection mode when set data for the facsimile is transmitted to the facsimile from the center station, and wherein the facsimile comprises means for changing the remote diagnosis permission or rejection mode of the facsimile to the remote diagnosis rejection mode when the data for changing the remote diagnosis permission or rejection mode of the facsimile to the remote diagnosis rejection mode is received.

2. A facsimile remote diagnostic system comprising one or a plurality of facsimiles and a center station for managing the facsimile or facsimiles, the center station having a function of carrying out remote diagnosis on the facsimile or facsimiles, wherein at least one facsimile comprises remote diagnosis permission or rejection mode selecting means for selecting a remote diagnosis permission mode in which remote diagnosis is permitted and a remote diagnosis rejection mode in which remote diagnosis is rejected, means for setting data having a remote diagnostic function as data relating to a remote diagnostic function in a pre-procedure signal sent out from the facsimile when the remote diagnosis permission mode is selected, means for setting data having no remote diagnostic function as data relating to a remote diagnostic function in a pre-procedure signal sent out from the facsimile when the remote diagnosis rejection mode is selected; and means for changing the remote diagnosis permission or rejection mode to the remote diagnosis rejection mode when a predetermined time has elapsed since the remote diagnosis permission mode was selected.

3. A facsimile having such a function that remote diagnosis is carried out by a center station, comprising:

remote diagnosis permission or rejection mode selecting means for selecting a remote diagnosis permission mode in which remote diagnosis is permitted and a remote diagnosis rejection mode in which remote diagnosis is rejected;

means for setting data having a remote diagnostic function as data relating to a remote diagnostic function in a pre-procedure signal sent out from the facsimile when the remote diagnosis permission mode is selected;

means for setting data having no remote diagnostic function as data relating to a remote diagnostic function in a pre-procedure signal sent out from the facsimile when the remote diagnosis rejection mode is selected; and means for changing the remote diagnosis permission or rejection mode to the remote diagnosis rejection mode when a predetermined time has elapsed since the remote diagnosis permission mode was selected.

4. A facsimile having such a function that remote diagnosis is carried out by a center station, comprising:

means for bringing the acceptance of input from an operation section into an inhibited state and starting the measurement of a predetermined time immediately after set data is transmitted to the center station by remote access from the center station;

means for releasing the inhibited state of the acceptance of the input from the operation section when said predetermined time has elapsed before new set data from the center station is received; and means for releasing the inhibited state of the acceptance of the input from the operation section when the new set data from the center station is received before said predetermined time has elapsed.

5. A facsimile having such a function that remote diagnosis is carried out by a center station, comprising:

means for bringing the acceptance of input from an operation section into an inhibited state and starting the measurement of a predetermined time immediately after set data is transmitted to the center station by remote access from the center station;

means for demanding the transmission of the set data of the center station when said predetermined time has elapsed before new set data from the center station is received; and means for releasing the inhibited state of the acceptance of the input from the operation section when the new set data from the center station is received.

* * * * *